US008503129B2

(12) United States Patent
Makino

(10) Patent No.: US 8,503,129 B2
(45) Date of Patent: Aug. 6, 2013

(54) LIBRARY DEVICE

(75) Inventor: Masaru Makino, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/434,683

(22) Filed: Mar. 29, 2012

(65) Prior Publication Data

US 2012/0250182 A1 Oct. 4, 2012

(30) Foreign Application Priority Data

Mar. 31, 2011 (JP) ................................. 2011-079682

(51) Int. Cl.
G11B 15/68 (2006.01)
(52) U.S. Cl.
USPC ....................................................... 360/92.1
(58) Field of Classification Search
USPC .......... 360/92.1, 98.06, 91, 99.16; 369/30.36; 720/623
See application file for complete search history.

(56) References Cited

U.S. PATENT DOCUMENTS

| 3,690,587 | A | * | 9/1972 | Kitazawa | ...................... 242/333 |
| 6,175,467 | B1 | | 1/2001 | Schneider et al. | |
| 6,229,666 | B1 | | 5/2001 | Schneider et al. | |
| 6,233,111 | B1 | | 5/2001 | Schneider et al. | |
| 6,236,530 | B1 | | 5/2001 | Schneider et al. | |
| 6,771,457 | B2 | * | 8/2004 | Flaherty et al. | .............. 360/92.1 |
| 8,194,365 | B1 | * | 6/2012 | Leng et al. | ............... 360/324.12 |
| 2008/0231988 | A1 | * | 9/2008 | Nave et al. | ..................... 360/92.1 |
| 2011/0235209 | A1 | * | 9/2011 | Minemura | ..................... 360/92.1 |

FOREIGN PATENT DOCUMENTS

| GB | 2 306 553 | A | 5/1997 |
| JP | 63-293747 | A | 11/1988 |
| JP | 02-84164 | U | 6/1990 |
| JP | 7-230662 | A | 8/1995 |
| JP | 8-195019 | | 7/1996 |
| JP | 2000-90652 | A | 3/2000 |
| JP | 2000-231752 | A | 8/2000 |
| JP | 2001-014825 | A | 1/2001 |
| JP | 2001-523877 | A | 11/2001 |
| JP | 2002-511538 | A | 4/2002 |
| JP | 2004-241016 | A | 8/2004 |
| JP | 2005-228394 | A | 8/2005 |
| JP | 2008-210474 | A | 9/2008 |

* cited by examiner

Primary Examiner — Allen T Cao
(74) Attorney, Agent, or Firm — McGinn IP Law Group, PLLC

(57) ABSTRACT

Provided is a library device with which an accessor can move even when a magnetic tape cartridge is ejected out from a magazine onto a transporting path on which the accessor moves. The library device includes: a magazine inside which slots are provided; a device main body which houses the magazine; an accessor provided on one side of the device main body; and a magnetic tape drive which transports cartridges. A cartridge ejection preventing mechanism for preventing ejection of the entire part of the cartridge from the slot is provided in an opening-part front face of the slot, and a cartridge stopper member of the ejection preventing mechanism is set to be reciprocally rotatable along the moving direction of the accessor.

8 Claims, 14 Drawing Sheets

LIBRARY DEVICE

CROSS-REFERENCE TO RELATED APPLICATION

This application is based upon and claims the benefit of priority from Japanese patent application No. 2011-079682, filed on Mar. 31, 2011, the disclosure of which is incorporated herein in its entirety by reference.

BACKGROUND OF THE INVENTION

1. Field of the Invention

The present invention relates to a library device and, more specifically, to a library device with which an accessor can move even when a cartridge is ejected out from a magazine onto a transport path on which the accessor moves.

2. Description of the Related Art

In a library device in general, a magazine is placed inside a device main body as a casing, and a plurality of magnetic tape cartridges are housed inside the magazine.

Further, the magnetic tape cartridge inside the magazine designated by a control module is taken out by using an accessor placed inside the device main body and transported to a magnetic tape drive, and prescribed processing is executed in that magnetic tape drive. Further, inside the magazine of the library device, there is provided a cartridge lock mechanism for preventing the magnetic tape cartridges housed inside the magazine from being ejected out of the magazine under a normal state.

As a technique related to the library device described above, there are a magazine and a cartridge for a library device with which the cartridge is loaded to the magazine only when the direction of the cartridge at the time of loading the cartridge to the magazine and the direction of the magazine at the time of inserting the magazine inside the device are proper (see Japanese Unexamined Patent Publication 2001-14825 (Patent Document 1), for example).

In the library device magazine and cartridge disclosed in Patent Document 1, a plate spring of the magazine is placed in a space generated by a tapered part of the cartridge when the cartridge is housed properly in the magazine, so that the plate spring is not ejected out from the magazine. Further, also known urea housed-object protecting mechanism which protects the housed object such as a cartridge from falling down due to shaking and from being taken out freely, a protection method thereof, a protection program thereof, and a library device (see Japanese Unexamined Patent Publication 2008-210474 (Patent Document 2), for example).

In the housed-object protection mechanism and the like disclosed in Patent Document 2, a door open/close mechanism section is automatically returned to a closed position through winding a coil spring to a supporting shaft and having the restoring force thereof work between the door and a side plate.

Further, a door lock mechanism section includes a plurality of stoppers supported rotatably from an upper edge and a lower edge of each door, in which an engaging hole for engaging a single stopper is formed in a top plate, and an engaging hole for engaging another stopper is formed in a bottom plate.

However, in a typical library device, when an unexpected oscillation or impact is applied to the device main body in a state where a magazine is placed inside the device main body and a cartridge lock mechanism of the magazine is released, a magnetic tape cartridge inside the magazine is ejected out on a transporting path on which an accessor moves and may fall out from the magazine in some cases.

This causes such an issue that the accessor cannot move because of the ejected or fallen magnetic tape cartridge.

As a result, the system has to be stopped. In order to reopen the system, it requires a manual operation, e.g., a worker pushes in the ejected magnetic tape cartridge inside the magazine and engages it to the cartridge lock mechanism, etc. This develops into an issue of having influences imposed upon the productivity.

Further, the library device magazine disclosed in Patent Document 1 is in a structure with which the cartridge is loaded to the magazine only when the direction of the cartridge at the time of loading the cartridge to the magazine and the direction of the magazine at the time of inserting the magazine inside the device are proper. Thus, it cannot deal with a case where the cartridge housed inside the magazine is ejected out on to the transporting path of the accessor. Therefore, the system has to be stopped as in the above-described case.

Further, the housed-object protecting mechanism and the like disclosed in Patent Document 2 are structured to lock the cartridge housed inside the cell with the door lock mechanism. Thus, as in the case of Patent Document 1, it cannot deal with a case where the cartridge housed inside the magazine is ejected out on to the transporting path of the accessor, so that the system has to be stopped as in the above-described case.

In order to overcome each of the above-described issues, it is an exemplary object of the present invention to provide a library device with which the accessor can move even when the magnetic tape cartridge is ejected out from the magazine onto the transporting path on which the accessor moves.

SUMMARY OF THE INVENTION

In order to achieve the foregoing exemplary object, the library device according to an exemplary aspect of the invention is characterized to include a magazine in which a plurality of slots for respectively housing a plurality of magnetic cartridges are arranged, a device main body which houses the magazine, a box-type accessor provided on one side of the device main body, which transports the magnetic tape cartridge taken out from the slot along a direction of arranging the slots, and a magnetic tape drive provided to the device main body, which loads the magnetic tape cartridge transported by the accessor and reads data therefrom, wherein: a cartridge ejection preventing mechanism for preventing ejection of the magnetic tape cartridge from each of the slots onto a transporting path is provided on an opening-part front face of each of the slots; and a cartridge stopper member of the cartridge ejection preventing mechanism is formed to be reciprocally rotatable along a moving direction of the accessor.

BRIEF DESCRIPTION OF THE DRAWINGS

FIGS. 12A and 12B show an association between movement of the accessor and the cartridge ejection preventing mechanism of the library device according to the exemplary embodiment, in which FIG. 12A is a state before the both make a contact, and FIG. 12B is an elevational view showing a state immediately after the both made a contact;

FIGS. 13A and 13B show an association between movement of the accessor and the cartridge ejection preventing mechanism of the library device according to the exemplary embodiment, in which FIG. 13A is a state where the cartridge ejection preventing mechanism rotates and a stopper member moves onto the upper face of the accessor, and FIG. 13B is an elevational view showing a state where the accessor passes and the cartridge ejection preventing mechanism returns to an initial state (original position)

DETAILED DESCRIPTION OF THE PREFERRED EMBODIMENTS

Figure 1:
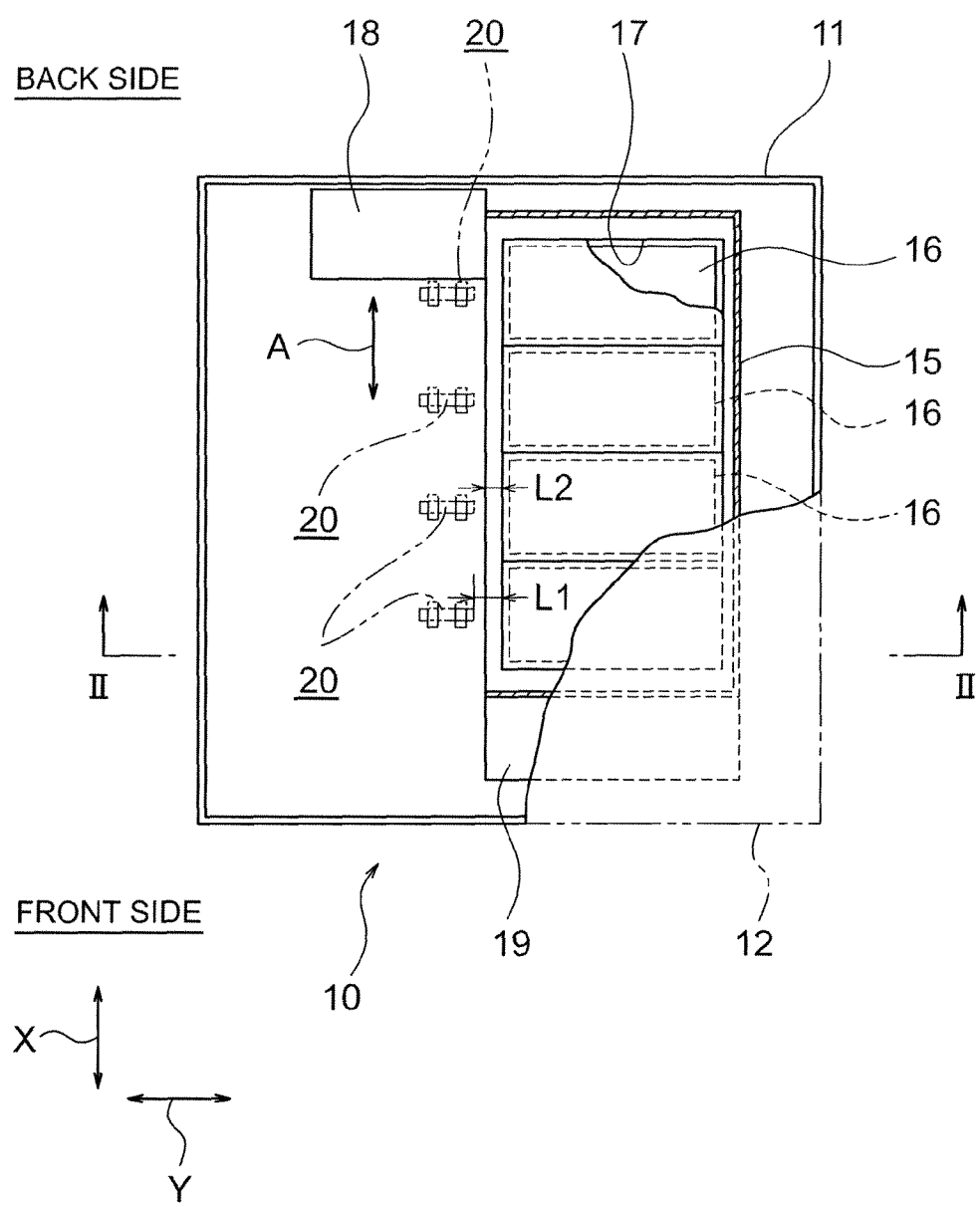
FIG. 1 is an entire plan schematic block diagram showing a first exemplary embodiment of a library device according to the present invention.
Figure 2:
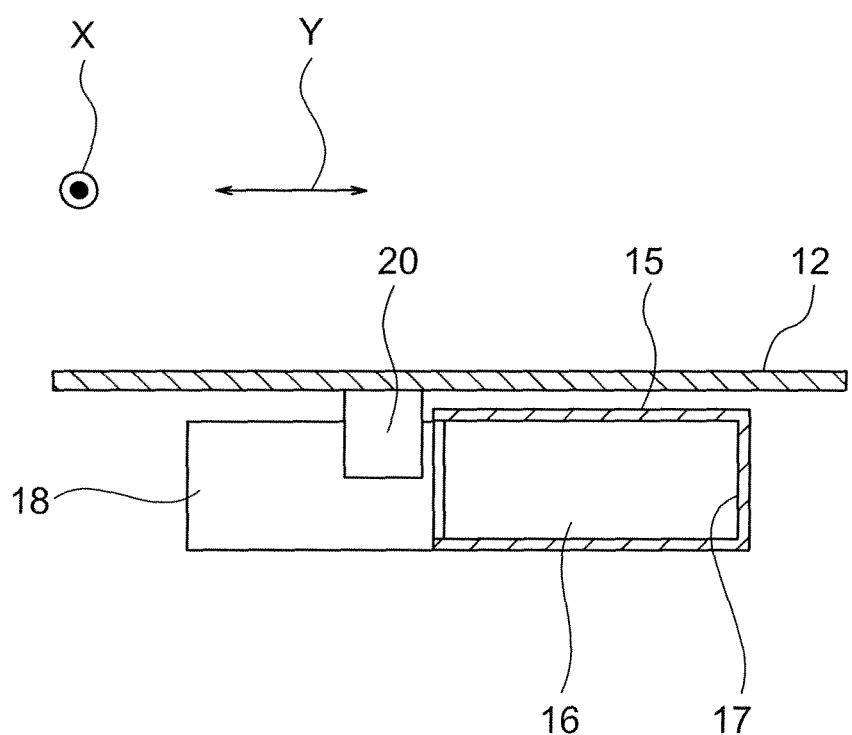
FIG. 2 is a longitudinal sectional view taken along a II-II line of FIG. 1.

Hereinafter, an exemplary embodiment of a library device according to the present invention will be described by referring to FIG. 1 to FIG. 12.

First, the entire library device 10 of the exemplary embodiment will be described by referring to FIG. 1 to FIG. 4.

The library device 10 according to the present invention includes a box-type device main body 11.

A lid member 12 substantially in a same shape as that of the device main body 11 is placed over the device main body 11.

Further, a magazine 15 is provided to the device main body 11, and a plurality of slots 17 for housing a plurality of magnetic tape cartridges (simply referred to as cartridges hereinafter) 16, respectively, are arranged side by side inside the magazine 15 along a longitudinal direction X of the device main body 11.

Figure 3:
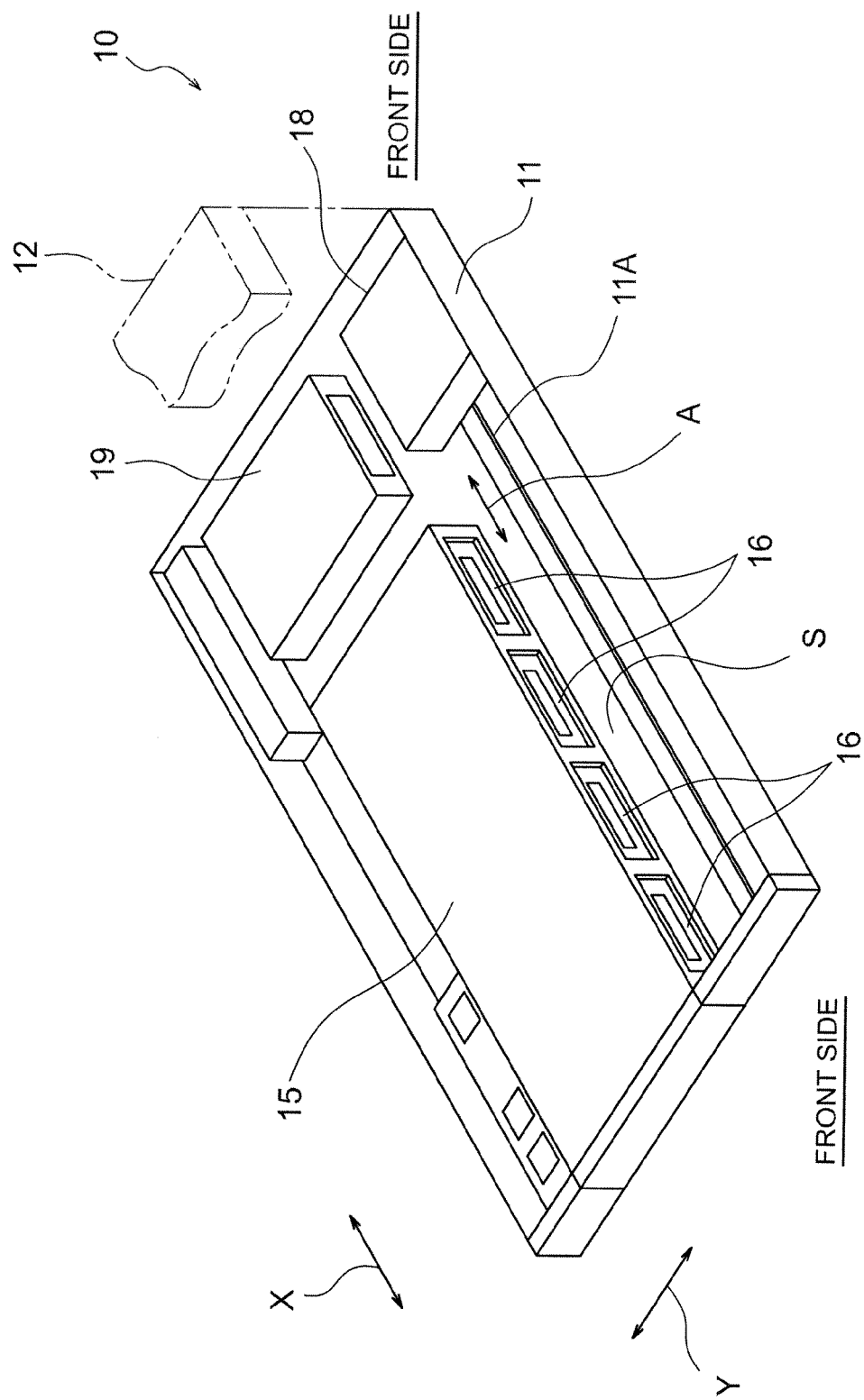
FIG. 3 is an entire perspective view showing the library device of the exemplary embodiment.

In FIG. 1 and FIG. 3 showing the entire part of the library device 10, the longitudinal direction of the device main body 11 is defined as the X direction, and the short-side direction (the direction orthogonal to the X direction) of the device main body 11 is defined as the Y direction. Further, an arrow A shows the moving direction of an accessor 18 to be described next, which is substantially the same direction as the X direction.

On one side of the device main body 11 along the longitudinal direction, the accessor 18 in a box shape that moves the cartridge 16 taken out from the slot 17 along the longitudinal direction X of the device main body 11, i.e., along the providing direction of the slots 17, is provided.

Further, a magnetic tape drive 19 is provided to the device main body 11. The magnetic tape drive 19 is placed on the forward side of the moving direction of the accessor 18 to take in the cartridge 16 transported by the accessor 18 and reads data therefrom.

Note here that the accessor 18 moves by being guided by a rail 11A provided on one side of the device main body 11 along the X direction.

Further, when taking out the cartridge 16 inside the slot 17 by the accessor 18, it is taken out from the slot 17 by using a known cartridge takeout mechanism, not shown, which is provided to the accessor 18.

As shown in FIG. 1 and FIG. 3, four slots 17 are arranged side by side in the magazine 15 of the library device 10 according to the exemplary embodiment, and one each of the cartridge 16 is housed in each of the slots 17.

Further, a preventing mechanism 20 described next is not illustrated in FIG. 3.

According to the present invention, the cartridge ejection preventing mechanism (referred simply as a preventing mechanism hereinafter) 20 is provided in the opening-part front face of each slot 17 of the library device 10 in the structure described above. This preventing mechanism 20 is for preventing the entire part of the cartridge 16 housed inside each slot 17 from being ejected out.

Figure 4:
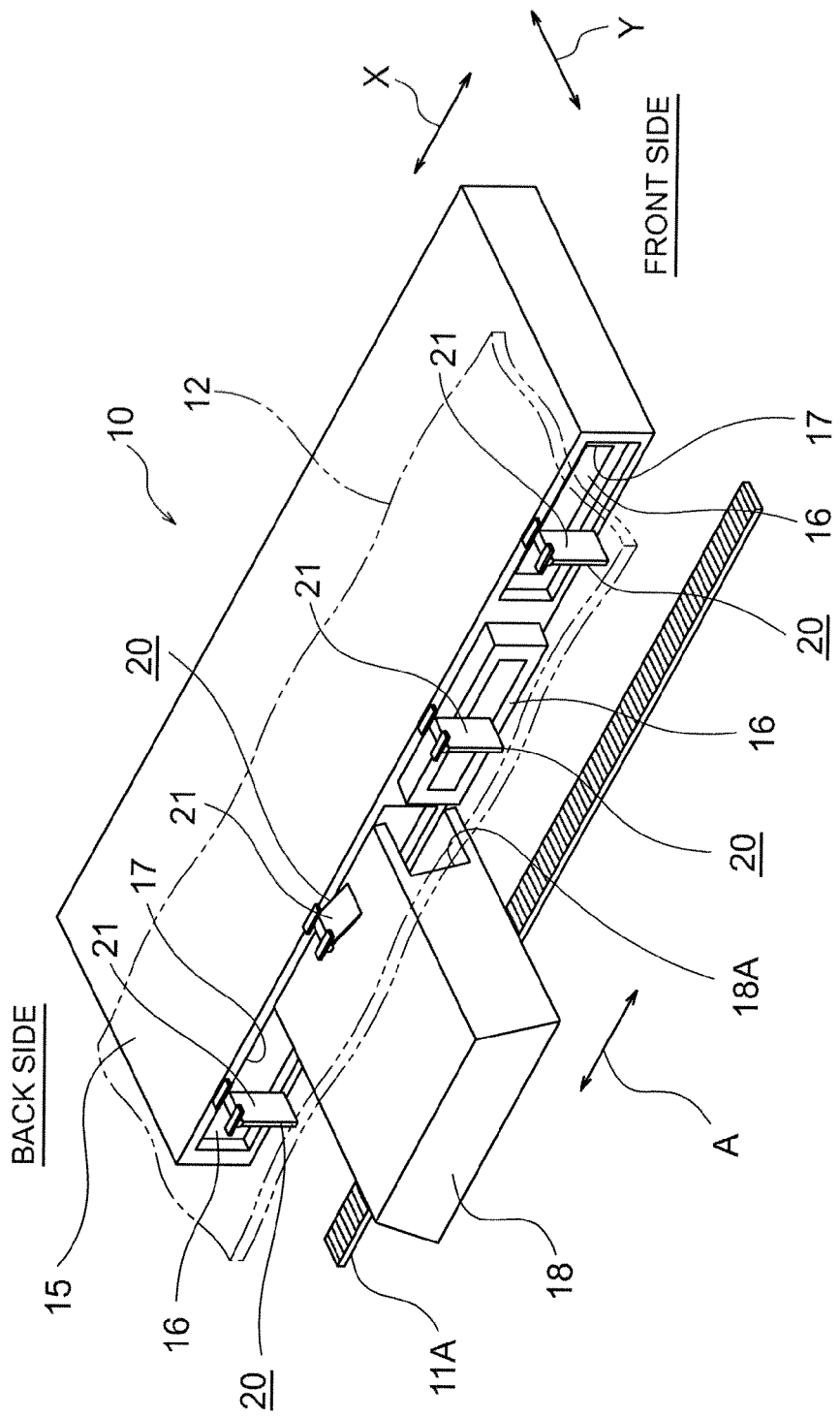
FIG. 4 is a perspective view showing the main part of the library device of the exemplary embodiment.

As shown in FIG. 1 and FIG. 4, the preventing mechanism 20 is provided to the lid member 12 in the opening-part front face of each slot 17.

Figure 5:
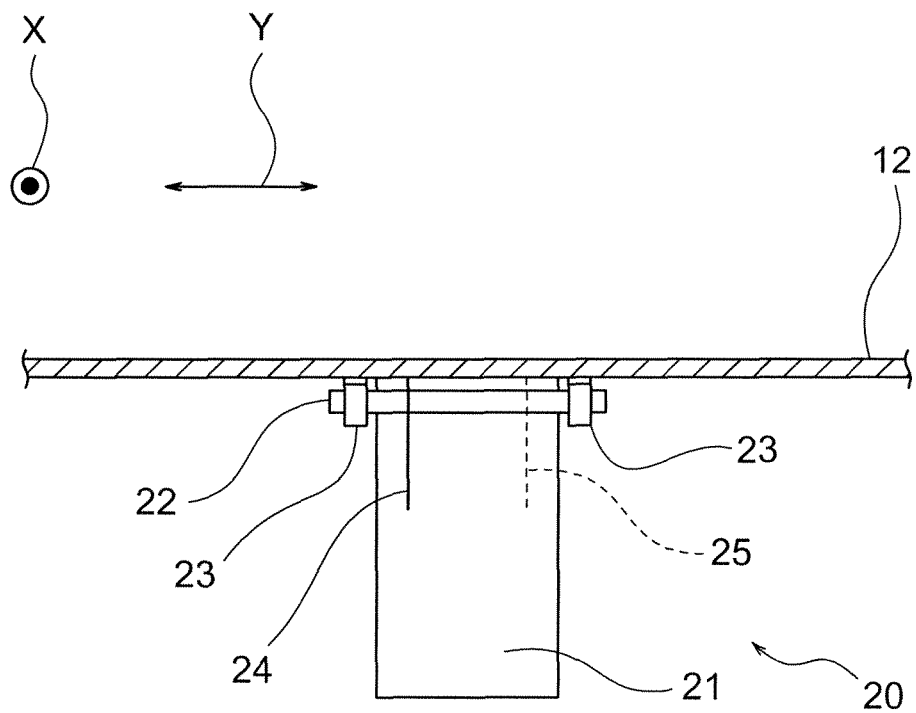
FIG. 5 is an elevational view showing a cartridge ejection preventing mechanism of the library device of the exemplary embodiment.
Figure 6:
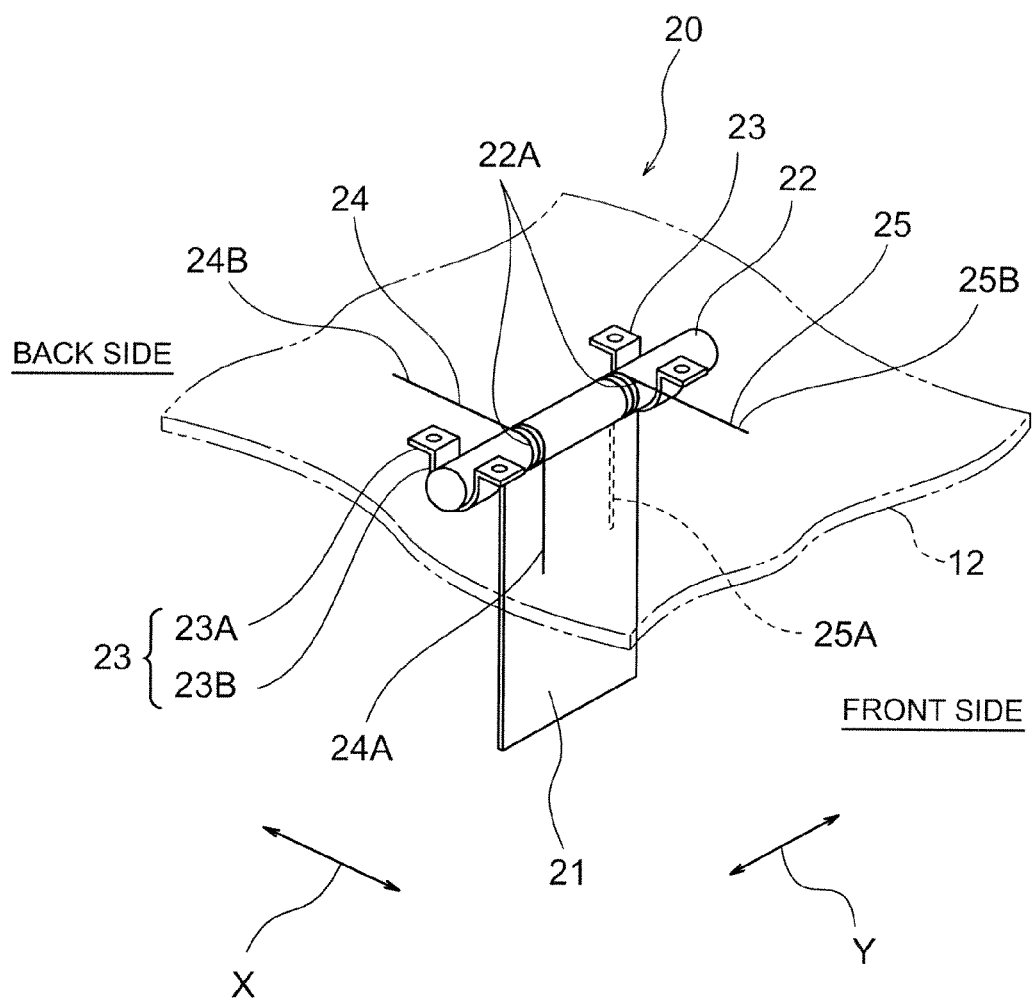
FIG. 6 is a perspective view showing the cartridge ejection preventing mechanism of the library device of the exemplary embodiment.

As shown in details in FIG. 5 and FIG. 6, the preventing mechanism 20 is constituted by including a plate-type stopper member 21 which prevents ejection of the entire part of the cartridge 16 by being abutted against the side face of the opening-part side of the cartridge 16. The stopper member 21 is attached to a shaft 22 that is a supporting member of a rod-type, for example, placed horizontally under a state where the width direction of the stopper member 21 is set along the axis line of the shaft 22. Normally, the stopper member 21 is in a perpendicular state. Further, one end of the stopper member 21 in the width direction is set to abut against the side face of the opening-part side of the cartridge 16 ejected out from the slot 17. Thereby, further ejection can be prevented (see FIG. 7).

The stopper member 21 is provided in the manner described above, so that it is placed in a state orthogonal to the transporting path S of the accessor 18. That is, the stopper member 21 is placed to obstruct the movement of the accessor 18 on the transporting path S.

A fastener 23 is fixed on both ends of the shaft 22. As shown in details in FIG. 6, the fastener 23 is formed in a shape having a substantially U-shaped shaft holding part 23A and a flat-type flange part 23B extended to each of both ends of the holding part 23A. The flange part 23B is fixed to the lid member 12 while holding the shaft 22 by the shaft pressing part 23A.

Further, at two points closer to the center part of the shaft 22, two linear coil springs 24 and 25 that are original-position returning springs whose winding directions are different form each other are mounted.

As shown in FIG. 6, those coil springs 24 and 25 are mounted by being wound twice, for example, along a groove 22A of a prescribed width formed along the diameter direction of the shaft 22 on the circumference part in such a manner that each of one ends 24A and 25A is abutted against the flat part of the stopper member 21 and each of the other ends 24B and 25B is abutted against the back face of the lid member 12.

That is, the attaching direction of the two coil springs 24 and 25 are as follows. The coil spring 24 is attached under a state where the one end 24A of the coil spring 24 on the left side of FIG. 6 is abutted against the top face (right-side face) of the stopper member 21 and the other end 24B of the coil spring 24 is extended to the back-face side of the lid member 12 (left direction of FIG. 6) and abutted against it.

In the meantime, the coil spring 25 is attached under a state where the one end 25A of the coil spring 25 on the right side of FIG. 6 is abutted against the back face (left-side face) of the stopper member 21 and the other end 25B of the coil spring 25 is extended to the back-face side of the lid member 12 (right direction of FIG. 6) and abutted against it.

Therefore, the stopper member 21 and the shaft 22 are reciprocally rotatable.

Further, the preventing mechanism 20 is constituted with the stopper member 21, the shaft 22, the fastener 23, and the two coil springs 24, 25.

Figure 12A:
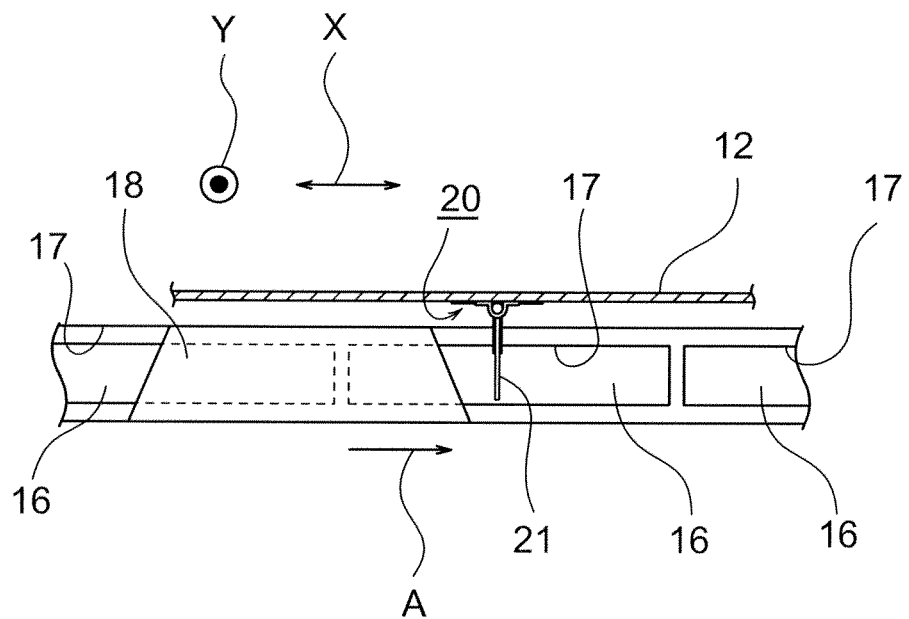
Figure 12B:
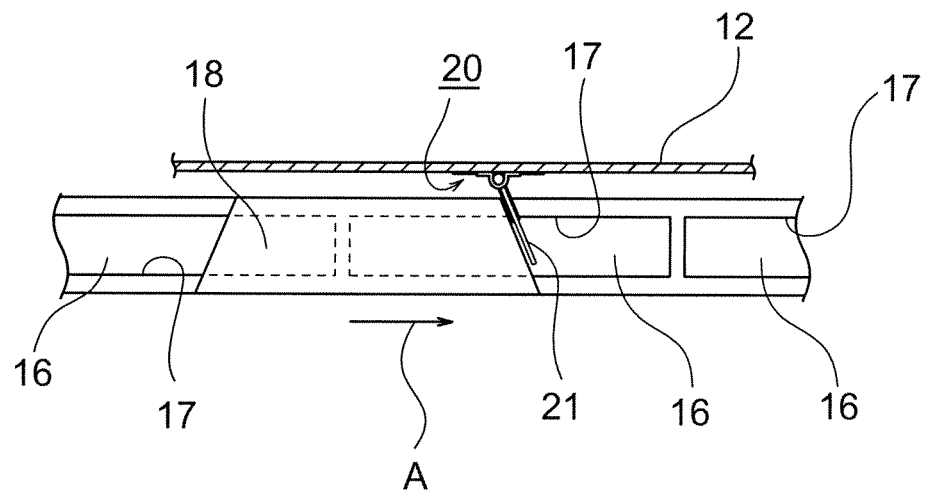

The stopper member 21 and the shaft 22 are integrated, and the shaft 22 is supported by the fastener 23 in a freely rotatable manner. Further, the coil springs 24 and 25 are mounted around the shaft. Thus, as shown in FIG. 12A and FIG. 12B, when the accessor 18 moves on the transporting path S and the top-end face thereof in the moving direction abuts against the stopper member 21, the stopper member 21 is pushed by the top-end face of the accessor 18 by resisting the energizing force of the coil springs 24, 25 and moved further. Therefore, the stopper member 21 is abutted against the top-end face of the accessor 18.

Figure 13A:
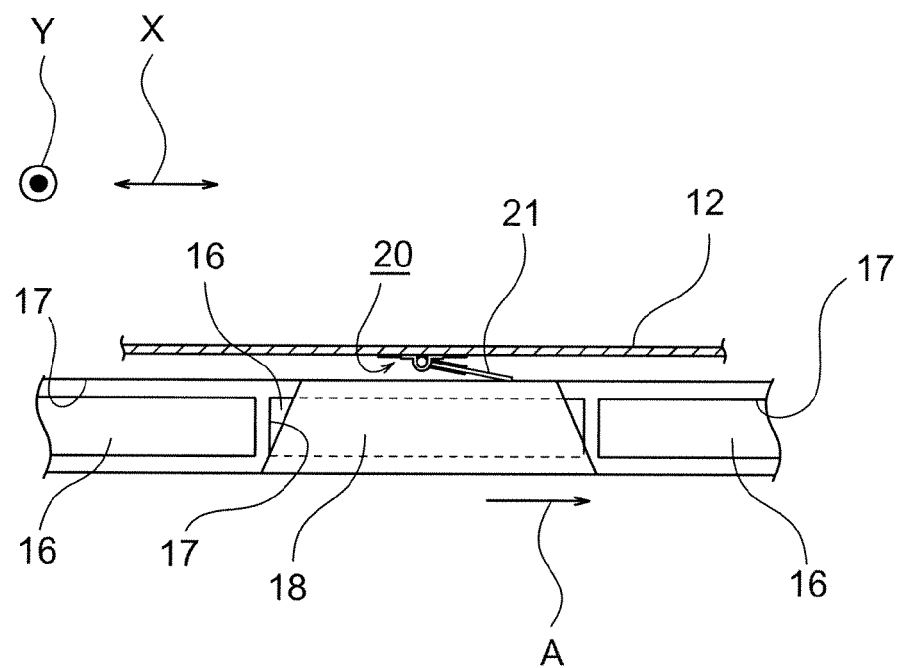
Figure 13B:
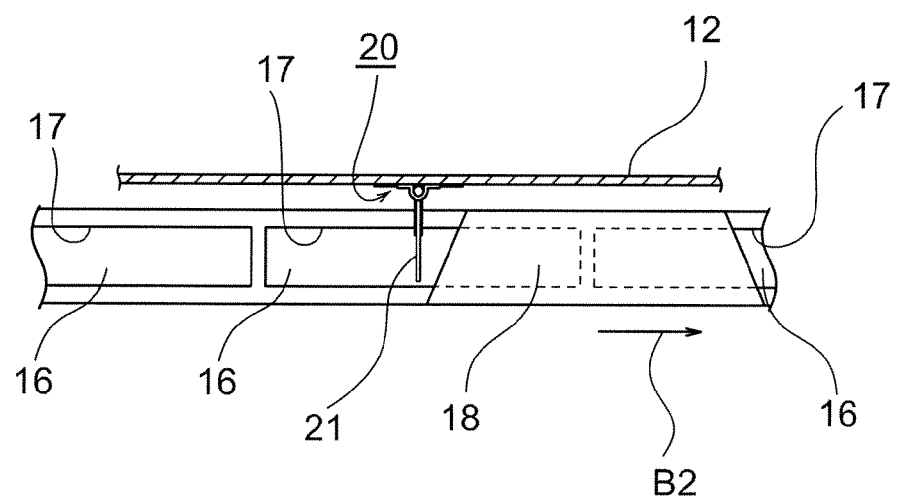

When the accessor 18 moves further from the state shown in FIG. 12A and FIG. 12B, the stopper member 21 runs onto the top face of the accessor 18 as shown in FIG. 13A. Thereafter, the stopper member 21 returns to the initial state (initial posture) by the energizing force of the coil springs 24, 25 as shown in FIG. 13B in accordance with the movement of the accessor 18.

Figure 7:
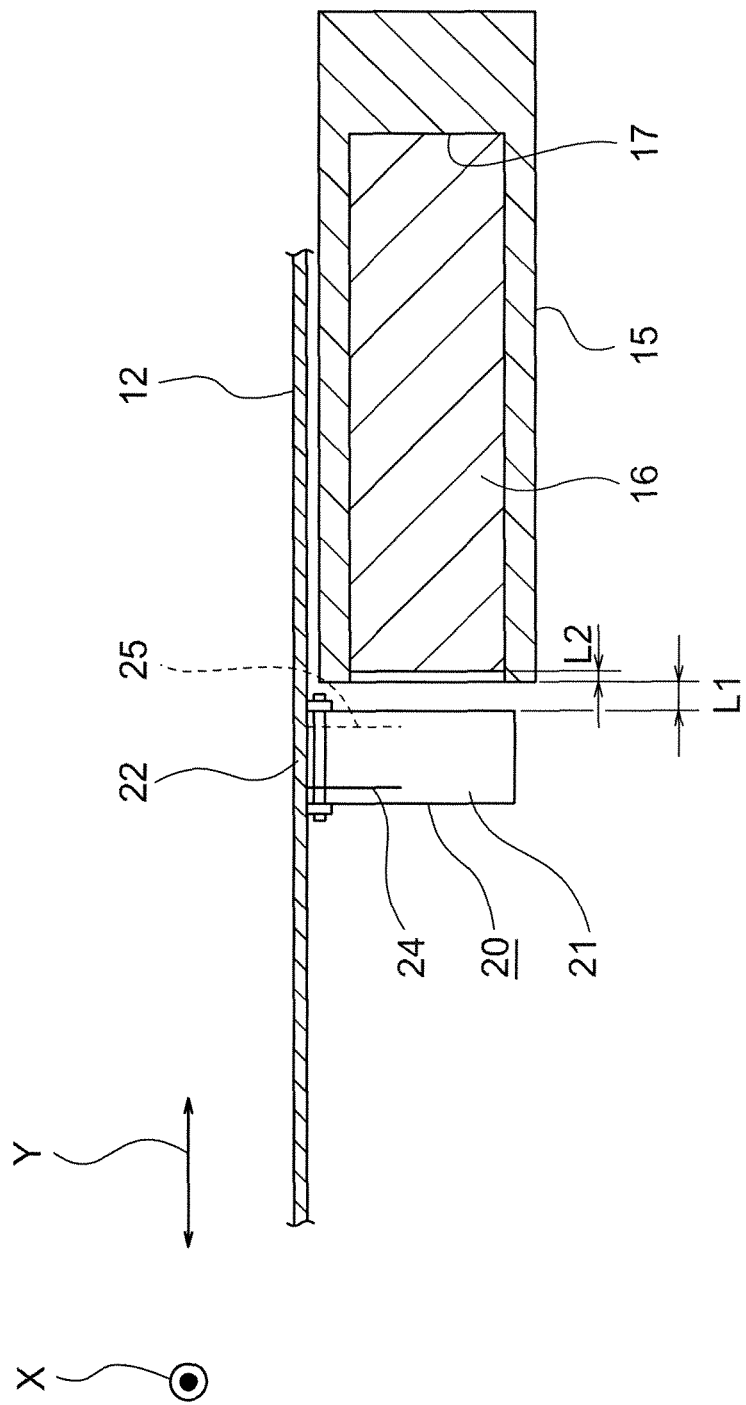
FIG. 7 is a longitudinal sectional view showing an association between the cartridge ejection preventing mechanism and a cartridge inside a magazine of the library device according to the exemplary embodiment under a state where the cartridge is not ejected out.

The stopper member 21 of the preventing mechanism 20 is provided in such a manner that one end thereof in the width direction comes at a position isolated from one end of the magazine 15 in the width direction by a distance L1 as shown in FIG. 1 and FIG. 7.

Further, the layout of each slot 17 with respect to the magazine 15 is set in advance to be in such mutual relationship that one end of each slot 17 in the width direction is located at a position isolated from one end of the magazine 15 in the width direction by a distance L2 as shown in FIG. 1 and FIG. 7.

In the meantime, regarding the positional relationship between the magazine 15 and the accessor 18, there is a small gap, i.e., a gap with which the accessor 18 can move smoothly, provided between the one end of the magazine 15 in the width direction and one end of the accessor 18 in the width direction.

Assuming that the accessor 18 is in a box shape and the side face on the cartridge 16 side is a flat face and that the cartridge 16 is ejected out of a prescribed slot 17 and the one-side face thereof is abutted against the stopper member 21, the cartridge 16 is in a state of blocking the transporting path S of the accessor 18.

Figure 11:
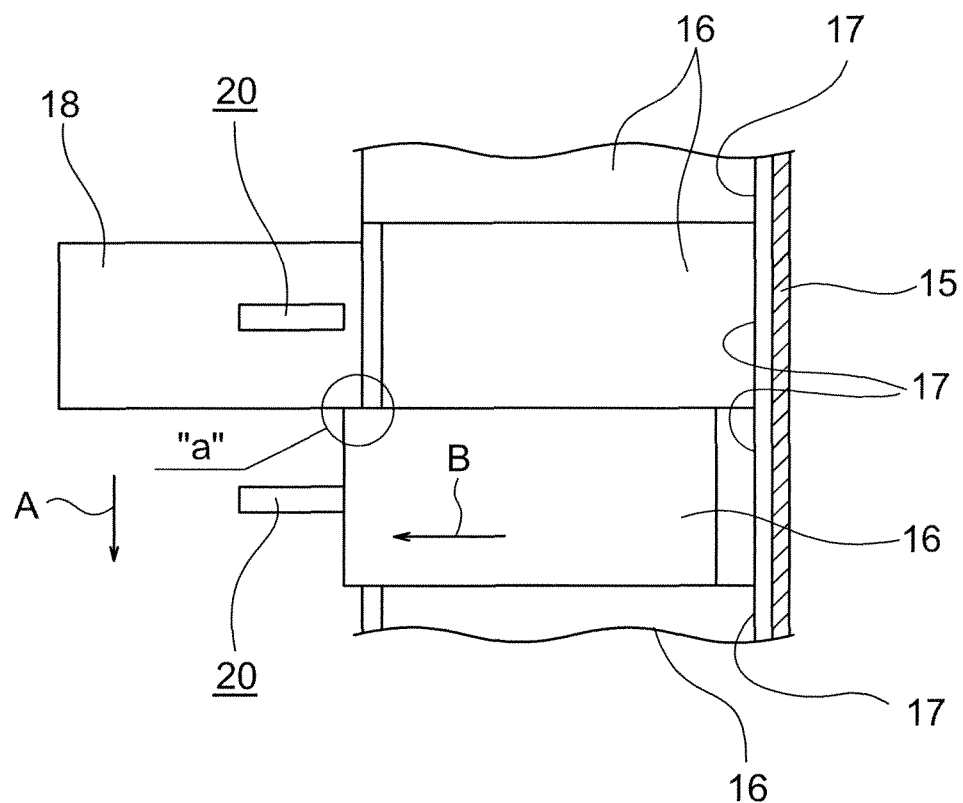
FIG. 11 is a plan view showing a state where the cartridge ejected out from the magazine and the accessor of the library device according to the exemplary embodiment are collided under a state where there is no escape groove is formed.

That is, as shown in section "a" of FIG. 11, the top end of the side face on the accessor 18 side of the cartridge 16 ejected in an arrow-B direction collides with the front face of one end of the accessor 18 in the moving direction. Thus, the accessor 18 cannot move any further.

Thus, in the exemplary embodiment, a U-shaped groove 18A as an escape groove recessed in the direction away from the magazine 15 is formed on the side face of the magazine 15 side of the accessor 18 so that the accessor 18 can move even when the cartridge 16 is ejected out from the prescribed slot 17, one side thereof abuts against the stopper member 21, and stops at that position as in the above-described case.

Figure 9:
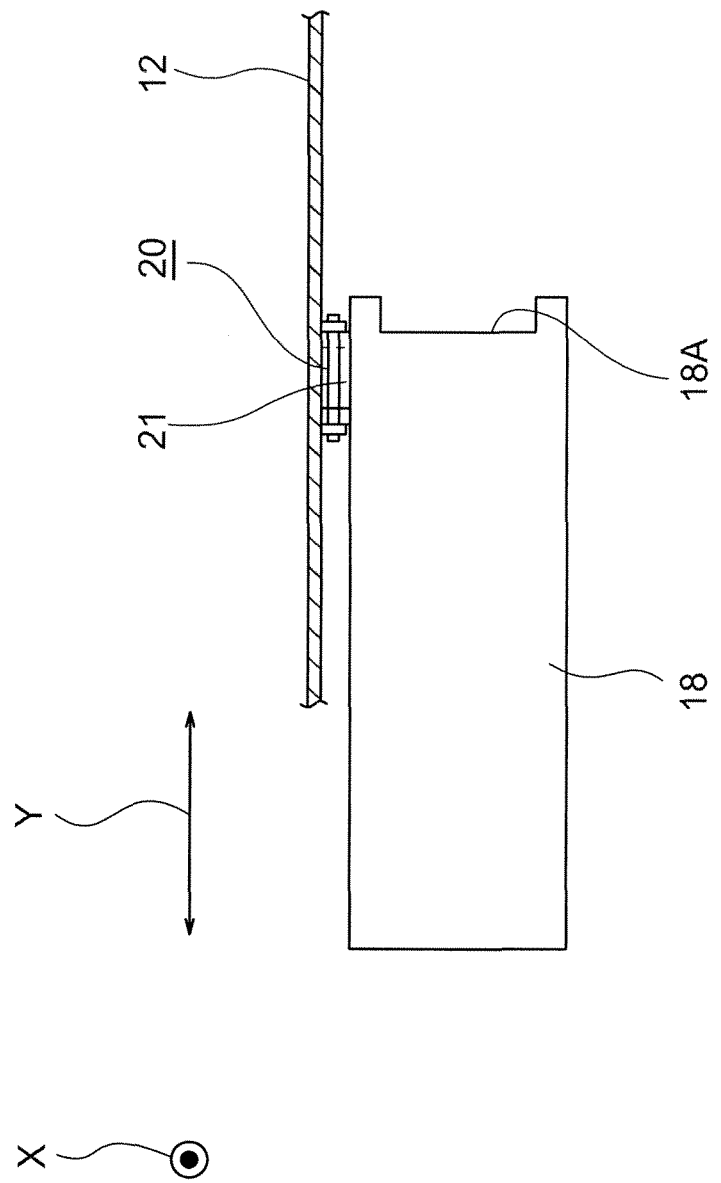
FIG. 9 is a longitudinal sectional view showing an association between the cartridge ejection preventing mechanism and an accessor of the library device according to the exemplary embodiment.

That is, as shown in details in FIG. 4 and FIG. 9, the U-shaped groove 18A is notched so that the top end of the cartridge 16 ejected out from the slot 17 can be evaded. As a result, the accessor 18 can move even when the cartridge 16 is ejected out on the transporting path S on which the accessor 18 moves.

Further, in a case where the ejected cartridge 16 is the one designated by a control module, not shown, and that cartridge 16 is to be taken out, the accessor 18 can move to the position of that cartridge 16. Thus, the accessor 18 can stop at that position and take out the cartridge 16 from the slot 17 by a takeout mechanism that is mounted to the accessor 18.

Next, the mutual association regarding the magazine 15, the accessor 18, and the preventing mechanism 20 will be described by referring to FIG. 7 to FIG. 10.

Figure 8:
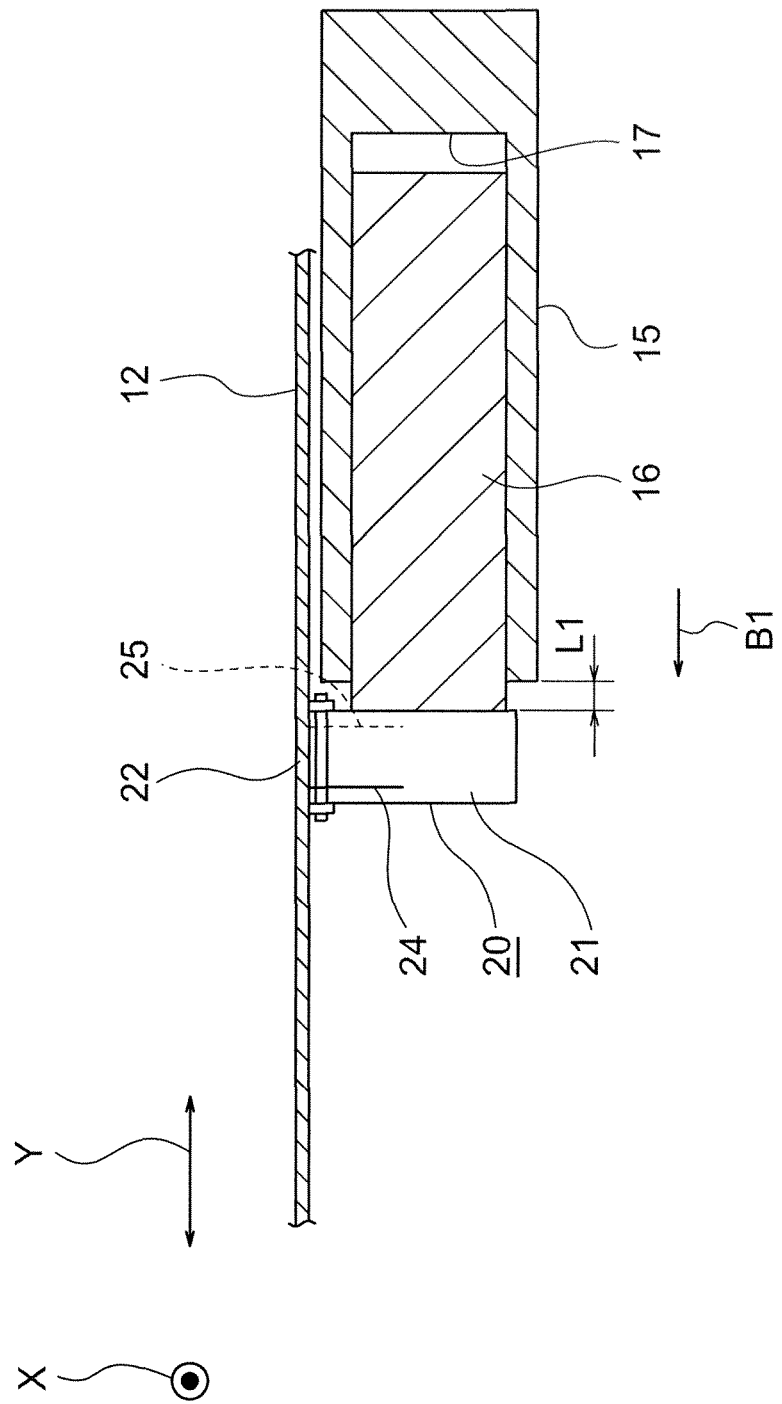
FIG. 8 is a longitudinal sectional view showing an association between the cartridge ejection preventing mechanism and the cartridge inside the magazine of the library device according to the exemplary embodiment under a state where the cartridge is ejected out.

First, when the lock mechanism of the cartridge 16 is released due to an unexpected vibration or impact applied on the magazine 15 under the state of FIG. 7, i.e., under a normal state, the cartridge 16 is ejected out and abuts against the stopper member 21 as shown in FIG. 8. Thus, the cartridge 16 cannot be ejected out any further.

Figure 10:
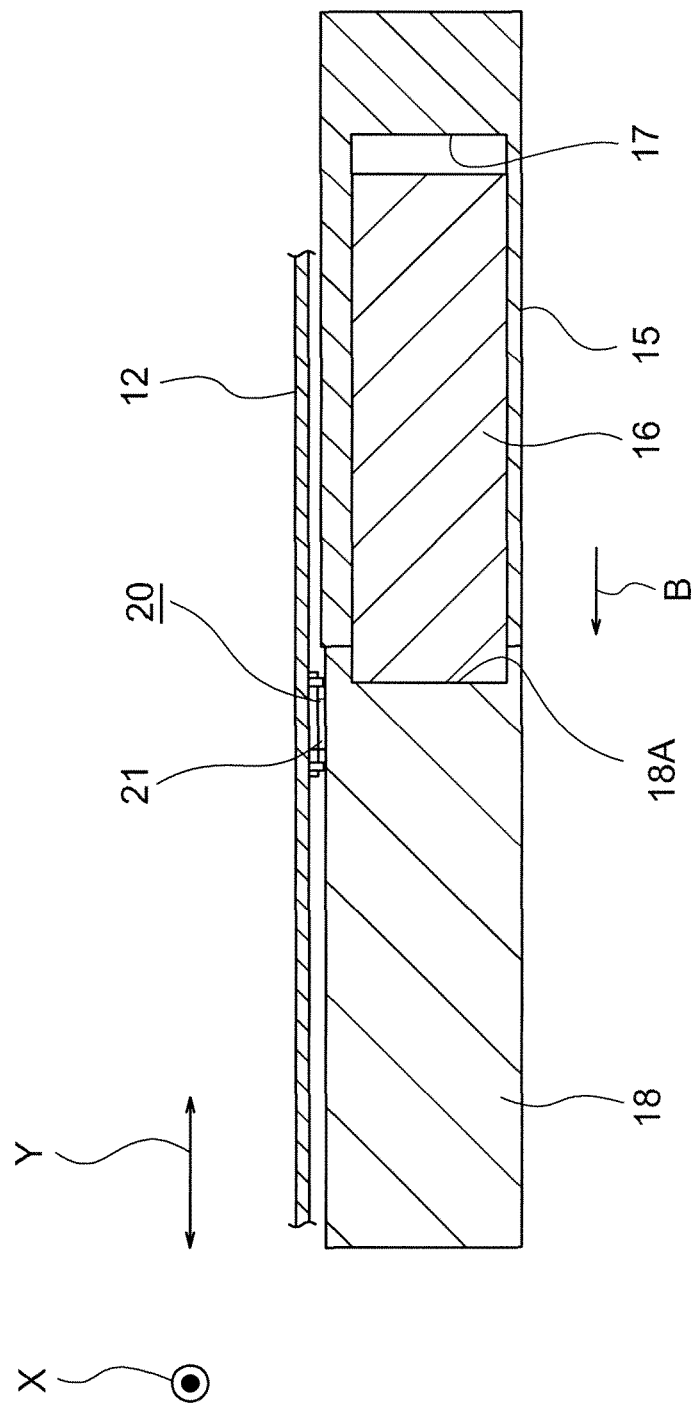
FIG. 10 is a longitudinal sectional view showing a relation regarding the cartridge ejection preventing mechanism, the cartridge ejected from the magazine, and the accessor of the library device according to the exemplary embodiment.

In the meantime, as shown in FIG. 10, when the accessor 18 moves in the orthogonal direction of FIG. 10, i.e., in the X direction, the accessor 18 can move without having the U-shaped groove 18A abutted against the top end of the cartridge 16 even when the top end of the cartridge 16 has moved to the arrow-B direction and is ejected out since the U-shaped groove 18A is formed in the accessor 18.

Next, the movement of the accessor 18 and the actions of the stopper member 21 in the preventing mechanism 20 will be described by referring to FIG. 12A, FIG. 12B, FIG. 13A and FIG. 13B.

When the accessor 18 moves along the moving direction of arrow A as shown in FIG. 12A, the accessor 18 first makes a contact with the stopper member 21 as shown in FIG. 12B.

When the accessor 18 advances further, the stopper member 21 is pushed by a sloping face on the moving-direction front face of the accessor 18 and rotated along the sloping face in the moving-direction top side of the accessor 18 by having the shaft 22 as the origin.

As shown in FIG. 13A, when the accessor 18 moves further, the stopper member 21 goes over the sloping face of the accessor 18 and then runs onto the top face of the accessor 18.

When the accessor 18 moves further as shown in FIG. 13B, the accessor 18 and the stopper member 21 come in a non-contact state, and the stopper member 21 is returned to the original position, i.e., the initial posture, by the energizing force of the springs 24 and 25.

Referring to FIG. 13A, in a case where the cartridge 16 is ejected out from the slot 17 in a position at which the accessor 18 is located and the cartridge 16 is the one designated to be taken out, the accessor 18 can stop at that position and may take out the ejected cartridge 16 by the cartridge takeout mechanism mounted to the accessor 18.

With the library device 10 of the exemplary embodiment structured in the manner described above, following effects can be acquired.

(1) The preventing mechanism 20 includes the stopper member 21, and the stopper member 21 is provided to the respective opening-part front face of a plurality of slots 17. Thus, even when an unexpected vibration or impact is applied to the magazine 15 and the lock mechanism of the magazine 15 is released so that the cartridge 16 is ejected out onto the transporting path S, the cartridge 16 becomes abutted against the stopper member 21 and is prevented from being ejected any further. Furthermore, the accessor 18 can move even in such case, so that it is possible to avoid intervention of manpower for stopping the system because of the ejection/fall of the cartridge 16 and for restarting the system.

(2) The stopper member 21 of the preventing mechanism 20 is provided to the opening-part front face of the slot 17, which makes a contact with the accessor 18 when the accessor 18 moves. However, the stopper member 21 is structured to be freely rotatable by having the shaft 22 as the origin, so that the stopper member 21 runs onto the accessor 18. Therefore, the stopper member 21 does not obstruct the movement of the accessor 18 even when the cartridge 16 is ejected out on the transporting path S, so that the accessor 18 can move normally.

(3) The U-shaped groove 18A is formed on the side face of the accessor 18 on the magazine 15 side, and the U-shaped groove 18A is formed to evade the top end of the cartridge 16 ejected out from the slot 17. Therefore, even when the cartridge 16 is ejected out, the accessor 18 can move without any obstruction.

(4) The U-shaped groove 18A is formed on the side face of the accessor 18 on the magazine 15 side, and the U-shaped groove 18A is formed to evade the top end of the cartridge 16 ejected out from the slot 17. Therefore, even when the ejected cartridge 16 is the designated one and that cartridge 16 is to be taken out, the accessor 18 can move to the position of that cartridge 16. As a result, the accessor 18 can stop at that position and take out the cartridge 16 from the slot 17.

(5) The stopper member 21 of the preventing mechanism 20 maintains a vertical state (state of the original position) under a normal state by the energizing force of the spring members 24, 25 mounted to the shaft 22, so that oscillation caused by the impact/vibration from the moving direction of the accessor 18 can be absorbed. As a result, the cartridge 16 ejected out from the slot 17 can be held at that position promptly and securely.

(6) The front and back faces of moving direction of the accessor 18 are formed in the sloping face 18B in which each upper face becomes narrower than the respective lower face, so that the stopper member 21 that makes a contact when the accessor 18 moves can easily rotate along the sloping face 18B. Thus, an excessive force is not applied to the stopper member 21, thereby making it possible to prevent damages to the stopper member 21.

Figure 14:
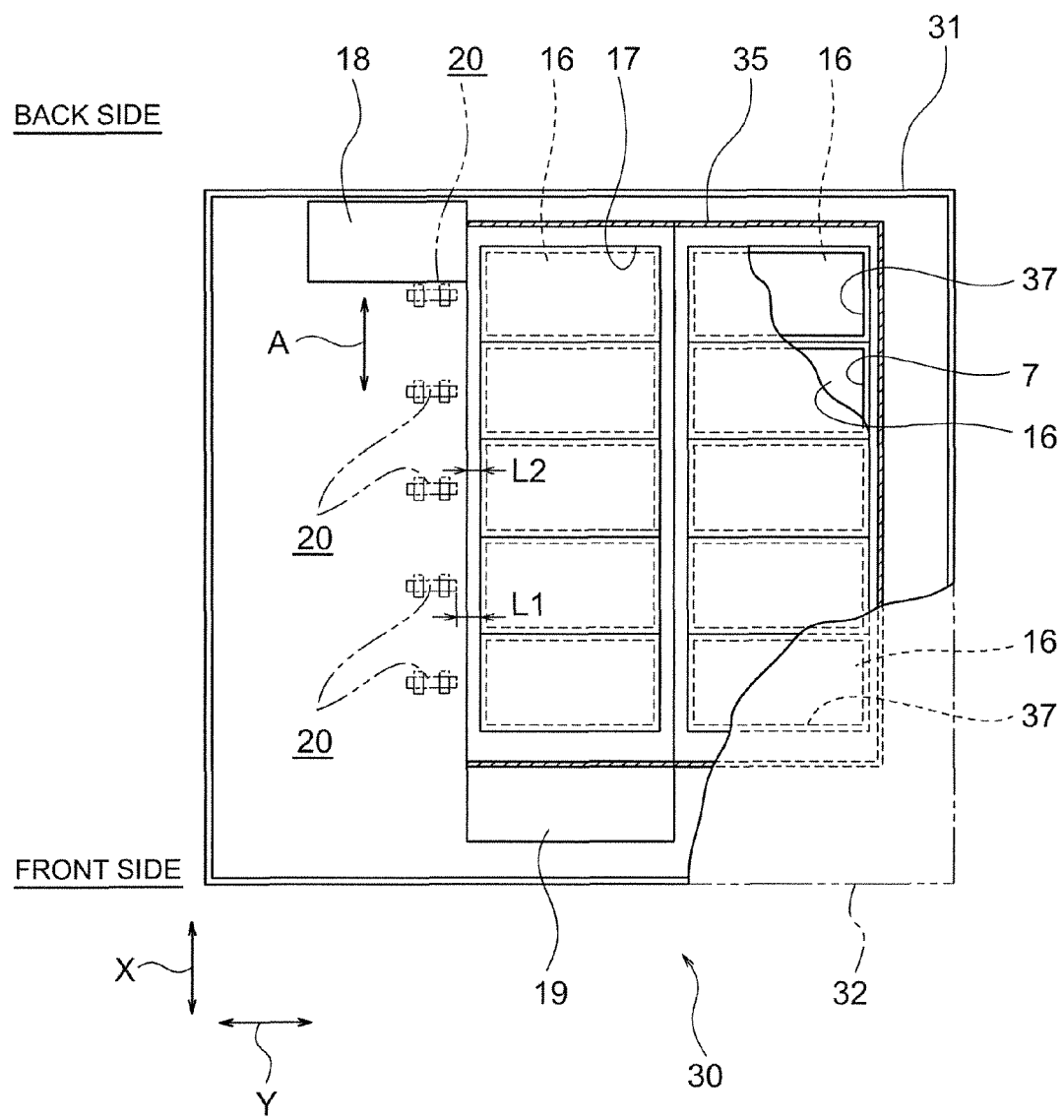
FIG. 14 is an entire plan schematic block diagram showing a second exemplary embodiment of the library device according to the present invention.

Next, a second exemplary embodiment of the library device according to the present invention will be described by referring to FIG. 14.

In the second exemplary embodiment, same reference numerals are applied to the structures and used members that are same as those of the first exemplary embodiment, and only different members and the like are to be described.

The library device 30 of the second exemplary embodiment includes a device main body 31, and a magazine 35 is housed inside the device main body 31. Slots 37 are provided in five lines in the magazine 35 along the moving direction A of the accessor 18. Further, one each of the cartridges 16 is housed on the front side and farther side of each of the slots 37.

Such library device 30 is so structured that a front-side slot 37 in one of the lines, for example, is kept as a vacant space for exchanging the cartridge, and the cartridges 16 on the front side and the farther side of each slot 37 can be transported to the magnetic tape drive 19 by using the vacant space.

Further, the preventing mechanism 20 is provided on the back face of a lid member 32 that is placed over the device main body 31.

The library device 30 of the second exemplary embodiment described above can acquire the same operation effects as those of the accessor 18 and the stopper member 21 of the preventing mechanism 20 as well as the same effects as those described in (1) to (6).

While the present invention has been described above by referring to each of the exemplary embodiments, the present invention is not limited only to each of those exemplary embodiments. Various kinds of modifications can be added to the structures and details of the present invention. Further, it is to be noted that the present invention includes forms acquired by properly combining a part of or a whole part of the structures of each of the exemplary embodiments. For example, each of the exemplary embodiments is so structured that the preventing mechanism 20 includes the shaft 22 fixed to the lid member 12 and the stopper member 21 provided to the shaft 22, and two coil springs 24, 25 for energizing the stopper member 21 are mounted to the shaft 22. However, the structure is not limited only to that.

It is also possible to employ a structure in which the stopper member is formed thicker than that of the stopper member 21 of each of the exemplary embodiments so as to rotate the stopper member by the weight of the stopper member itself, so that it is unnecessary to use the coil springs 24 and 25.

Further, each of the exemplary embodiments is so structured that the preventing mechanism 20 includes the shaft 22, the plate-type stopper member 21, and the coil springs 24, 25, and the shaft 22 is fixed to the lid member 12 by the fastener 23. However, the structure is not limited only to that.

For example, it is also possible to employ a preventing mechanism of a structure in which: a rod-type member is bent in an L-letter shape, and the top end of the bent form is located at the same position for taking up the same role as that of the stopper member 21 of each of the exemplary embodiments; and the other end of the rod-type member is supported on the top face of the magazine to be freely rotatable via a fastener. In this case, the other end of the rod-type member is set not to come of from the fastener.

This makes it possible to acquire such effects that the structure of the preventing mechanism becomes simple and the manufacturing cost and the like can be suppressed.

As an exemplary advantage according to the invention, the present invention, the cartridge ejection preventing mechanism is provided on the opening-part front face of the slot, and the cartridge stopper member provided to the cartridge ejection preventing mechanism is structured to be reciprocally rotatable along the moving direction of the accessor. Thus, the accessor can move even when the magnetic tape cartridge inside the magazine is ejected out onto the transporting path of the accessor. As a result, it becomes unnecessary to stop the system.

While the present invention has been described above by referring to each of the exemplary embodiments, the present invention is not limited only to each of those exemplary embodiments. Various changes and modifications occurred to those skilled in the art can be applied to the structures and details of the present invention. Further, the present invention includes combinations of a part of or a whole part of the structures of each of the above-described embodiments.

A part of or a whole part of the exemplary embodiment disclosed above can be appropriately expressed by following Supplementary Notes depicted below. However, it is to be noted that the modes for embodying the present invention and the technical spirit of the present invention are not limited only to those.

(Supplementary Note 1)

A library device which includes a magazine in which a plurality of slots for respectively housing a plurality of magnetic tape cartridges are arranged, a device main body which houses the magazine, a box-type accessor provided on one side of the device main body, which transports the magnetic tape cartridge taken out from the slot along a direction of arranging the slots, and a magnetic tape drive provided to the device main body, which loads the magnetic tape cartridge transported by the accessor and reads data therefrom, wherein: a cartridge ejection preventing mechanism for preventing ejection of the magnetic tape cartridge from each of the slots onto a transporting path is provided on an opening-part front face of each of the slots; and a cartridge stopper member of the cartridge ejection preventing mechanism is formed to be reciprocally rotatable along a moving direction of the accessor.

(Supplementary Note 2)

The library device as depicted in Supplementary Note 1, wherein: the device main body includes a lid member that covers the device main body; and the cartridge ejection preventing mechanism includes a supporting member that supports the stopper member, and a fastener for fixing the supporting member to a back face of the lid member.

(Supplementary Note 3)

The library device as depicted in Supplementary Note 1 or 2, wherein the stopper member is formed with a plate-type member, and arranged in a state orthogonal to the moving direction of the accessor.

(Supplementary Note 4)

The library device as depicted in Supplementary Note 3, wherein an original-position returning spring which sets the plate-type stopper member in a hang-down state is provided to the supporting member.

(Supplementary Note 5)

The library device as depicted in Supplementary Note 4, wherein: the original-position returning spring is formed with two coil springs; those coil springs are placed closer to both ends of width direction of the plate-type stopper member; and each of the coil springs is attached in such a manner that facing directions thereof are different from each other.

(Supplementary Note 6)

The library device as depicted in any one of Supplementary Notes 2 to 5, wherein a U-shaped groove for allowing an ejected part of the magnetic tape cartridge which is ejected out from the slot and abutted against the stopper member to pass along is provided on a side face on the opening-part side of the accessor.

(Supplementary Note 7)

The library device as depicted in any one of Supplementary Notes 1 to 6, wherein each of front and back faces in the moving direction of the accessor is formed as a sloping face in which an upper face is narrower than a lower face.

Industrial Applicability

The present invention can be utilized when the magnetic tape cartridge is ejected out on the transporting path of the accessor in the library device in which one of the plurality of magnetic tape cartridges housed in the magazine is transported by the accessor.

What is claimed is:

1. A library device, comprising
a magazine in which a plurality of slots for respectively housing a plurality of magnetic tape cartridges are arranged,
a device main body which houses the magazine,
a box-type accessor provided on one side of the device main body, which transports the magnetic tape cartridge taken out from the slot along a direction of arranging the slots, and
a magnetic tape drive provided to the device main body, which loads the magnetic tape cartridge transported by the accessor and reads data therefrom, wherein:
a cartridge ejection preventing mechanism for preventing ejection of the magnetic tape cartridge from each of the slots onto a transporting path is provided on an opening-part front face of each of the slots; and
a cartridge stopper member of the cartridge ejection preventing mechanism is formed to be reciprocally rotatable along a moving direction of the accessor.

2. The library device as claimed in claim 1, wherein:
the device main body comprises a lid member that covers the device main body; and
the cartridge ejection preventing mechanism comprises a supporting member that supports the stopper member, and a fastener for fixing the supporting member to a back face of the lid member.

3. The library device as claimed in claim 2, wherein
the stopper member is formed with a plate-type member, and arranged in a state orthogonal to the moving direction of the accessor.

4. The library device as claimed in claim 3, wherein
an original-position returning spring which sets the plate-type stopper member in a hang-down state is provided to the supporting member.

5. The library device as claimed in claim 4, wherein:
the original-position returning spring is formed with two coil springs; those coil springs are placed closer to both ends of width direction of the plate-type stopper member; and each of the coil springs is attached in such a manner that facing directions thereof are different from each other.

6. The library device as claimed in claim 1, wherein
a U-shaped groove for allowing an ejected part of the magnetic tape cartridge which is ejected out from the slot and abutted against the stopper member to pass along is provided on a side face on the opening-part side of the accessor.

7. The library device as claimed in claim 1, wherein
each of front and back faces in the moving direction of the accessor is formed as a sloping face in which an upper face is narrower than a lower face.

8. A library device, comprising
a magazine in which a plurality of slots for respectively housing a plurality of magnetic tape cartridges are arranged,
a device main body which houses the magazine,
a box-type accessor provided on one side of the device main body, which transports the magnetic tape cartridge taken out from the slot along a direction of arranging the slots, and magnetic tape drive means provided to the device main body, which loads the magnetic tape cartridge transported by the accessor, for reading data therefrom, wherein:

cartridge ejection preventing means for preventing ejection of the magnetic tape cartridge from each of the slots onto a transporting path is provided on an opening-part front face of each of the slots; and a cartridge stopper member of the cartridge ejection preventing means is formed to be reciprocally rotatable along a moving direction of the accessor.

* * * * *